US008826287B1

(12) United States Patent
Graupner et al.

(10) Patent No.: US 8,826,287 B1
(45) Date of Patent: Sep. 2, 2014

(54) SYSTEM FOR ADJUSTING COMPUTER RESOURCES ALLOCATED FOR EXECUTING AN APPLICATION USING A CONTROL PLUG-IN

(75) Inventors: Sven Graupner, Mountain View, CA (US); Nigel Cook, Boulder, CO (US); Jean-Marc Chevrot, Thoiry (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1720 days.

(21) Appl. No.: 11/046,333

(22) Filed: Jan. 28, 2005

(51) Int. Cl.
*G06F 9/46* (2006.01)
*G06F 15/173* (2006.01)

(52) U.S. Cl.
USPC ........... 718/104; 718/105; 709/223; 709/224; 709/225; 709/226

(58) Field of Classification Search
USPC .................................................. 718/100, 104
See application file for complete search history.

(56) References Cited

U.S. PATENT DOCUMENTS

| 6,067,412 | A  | * | 5/2000  | Blake et al. ................... 718/102 |
| 6,529,784 | B1 | * | 3/2003  | Cantos et al. ................... 700/79 |
| 6,675,261 | B2 | * | 1/2004  | Shandony ...................... 711/121 |
| 6,742,015 | B1 | * | 5/2004  | Bowman-Amuah .......... 718/101 |
| 6,754,181 | B1 | * | 6/2004  | Elliott et al. ................... 370/252 |
| 6,909,708 | B1 | * | 6/2005  | Krishnaswamy et al. .... 370/352 |
| 7,054,943 | B1 | * | 5/2006  | Goldszmidt et al. .......... 709/229 |
| 7,089,558 | B2 | * | 8/2006  | Baskey et al. ................. 718/104 |
| 7,191,329 | B2 | * | 3/2007  | Murphy ......................... 713/100 |
| 7,197,555 | B1 | * | 3/2007  | Sheikh .......................... 709/224 |
| 7,228,546 | B1 | * | 6/2007  | McCarthy et al. ............. 718/104 |
| 7,246,181 | B2 | * | 7/2007  | Rosing ............................. 710/18 |
| 7,308,687 | B2 | * | 12/2007 | Trossman et al. ............. 718/104 |
| 7,325,050 | B2 | * | 1/2008  | O'Connor et al. ............. 709/223 |
| 7,356,730 | B2 | * | 4/2008  | Ulrich et al. ...................... 714/6 |
| 7,395,536 | B2 | * | 7/2008  | Verbeke et al. ............... 718/100 |
| 7,644,161 | B1 | * | 1/2010  | Graupner et al. ............. 709/226 |
| 7,665,090 | B1 | * | 2/2010  | Tormasov et al. ............ 718/104 |
| 7,752,623 | B1 | * | 7/2010  | Crawford, Jr. ................ 718/104 |
| 2002/0087611 | A1 | * | 7/2002  | Tanaka et al. ..................... 709/1 |
| 2002/0091745 | A1 | * | 7/2002  | Ramamurthy et al. ....... 709/100 |
| 2002/0152254 | A1 | * | 10/2002 | Teng .............................. 709/100 |
| 2002/0178262 | A1 | * | 11/2002 | Bonnell et al. ................ 709/225 |
| 2002/0194251 | A1 | * | 12/2002 | Richter et al. ................ 709/105 |
| 2003/0028642 | A1 | * | 2/2003  | Agarwal et al. .............. 709/226 |
| 2003/0041110 | A1 | * | 2/2003  | Wenocur et al. ............. 709/206 |
| 2003/0093527 | A1 | * | 5/2003  | Rolia ............................. 709/226 |
| 2003/0135609 | A1 | * | 7/2003  | Carlson et al. ............... 709/224 |
| 2003/0177165 | A1 | * | 9/2003  | Bradley et al. ............... 709/105 |
| 2004/0177245 | A1 | * | 9/2004  | Murphy ......................... 713/100 |
| 2004/0193468 | A1 | * | 9/2004  | Mosquera et al. ................ 705/8 |
| 2004/0221038 | A1 | * | 11/2004 | Clarke et al. ................. 709/226 |
| 2005/0071843 | A1 | * | 3/2005  | Guo et al. ..................... 718/101 |

(Continued)

OTHER PUBLICATIONS

Ahmed, K. et al., "The Cluster as Server: An Integrated Approach to Managing HPC Clusters", Nov. 2002.

(Continued)

*Primary Examiner* — Adam Lee

(57) ABSTRACT

A resource manager computer system allocates computer resources from a pool of computer resources for executing an application. A data monitoring system monitors metrics for the allocated computer resources, and a resource assessment computer system executes a control plug-in specifying a policy for determining whether to adjust the allocated computer resources based on the metrics.

20 Claims, 4 Drawing Sheets

FIG. 3

(56) References Cited

U.S. PATENT DOCUMENTS

| | | | |
|---|---|---|---|
| 2005/0108398 A1* | 5/2005 | Levanoni et al. | 709/225 |
| 2005/0125797 A1* | 6/2005 | Gabrani et al. | 718/100 |
| 2006/0090163 A1* | 4/2006 | Karisson et al. | 718/105 |

OTHER PUBLICATIONS

Foster, I. et al., "The Grid: Bluepring for a New Computing Infrastructure", Morgan Kaufmann Publishers, ISBN, 1999, p. 270-293.

HP Utility Data Center, http://www.hp.com/go/hpudc, downloaded Jan. 25, 2005.

SmartFrog, http://www.smartfrog.org, downloaded Jan. 25, 2005.

Web Services Management Framework, Version 2.0, http://devresource.hp.com/drc/specifications/wsmf/index.jsp, downloaded Jan. 26, 2005.

IBM : xCAT, Extreme Cluster Administration Toolkit, http://www.alphaworks.ibm.com/tech/xCAT, downloaded Jan. 26, 2005.

Globus: Monitoring and Discovery Service (MDS), http://www.globus.org/mds/mds2, downloaded Jan. 26, 2005.

Global Grid Forum: Open Grid Services Infrastructure v1.0, http://www.gridforum.org/, Jun. 2003.

OASIS: Universal Description, Discovery and Integration (UDDI), http://www.uddi.org, downloaded Jan. 26, 2005.

Sun Microsystems: Sun Grid Engine, http://www.sun.com/software;gridware, downloaded Jan. 26, 2005.

\* cited by examiner

SYSTEM FOR ADJUSTING COMPUTER RESOURCES ALLOCATED FOR EXECUTING AN APPLICATION USING A CONTROL PLUG-IN

TECHNICAL FIELD

This technical field relates generally to adjusting allocated computer resources using a control plug-in.

BACKGROUND

Grid computing services, utility-based data centers, and other types of resource-on-demand systems are becomingly increasingly popular as a means for efficiently and cost-effectively taking advantage of computer resources to meet the computing demands of users. However, managing these resource-on-demand systems is a difficult task that conventional network management software is not equipped to handle.

Many management tasks are performed manually, which tends to be time consuming and costly. For example, selecting computer resources from a pool of resources to assign to a particular user's computing demands is typically performed manually. The monitoring of the pool of resources may be performed using conventional management tools. However, the decision of which resources to select for a user's computing demands or whether to reassign resources after initially selecting resources is performed by a system administrator. In addition, current resource-on-demand systems may not efficiently utilize available resources from the resource pool. For example, in many systems, resources remain idle and unused if not assigned to a particular user, even if assigning the idle resources may result in increased efficiency for the user's applications.

SUMMARY

According to an embodiment, a resource manager computer system allocates computer resources from a pool of computer resources for executing an application. A data monitoring system monitors metrics for the allocated computer resources, and a resource assessment computer system executes a control plug-in specifying a policy for determining whether to adjust the allocated computer resources based on the metrics.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

Figure 1:
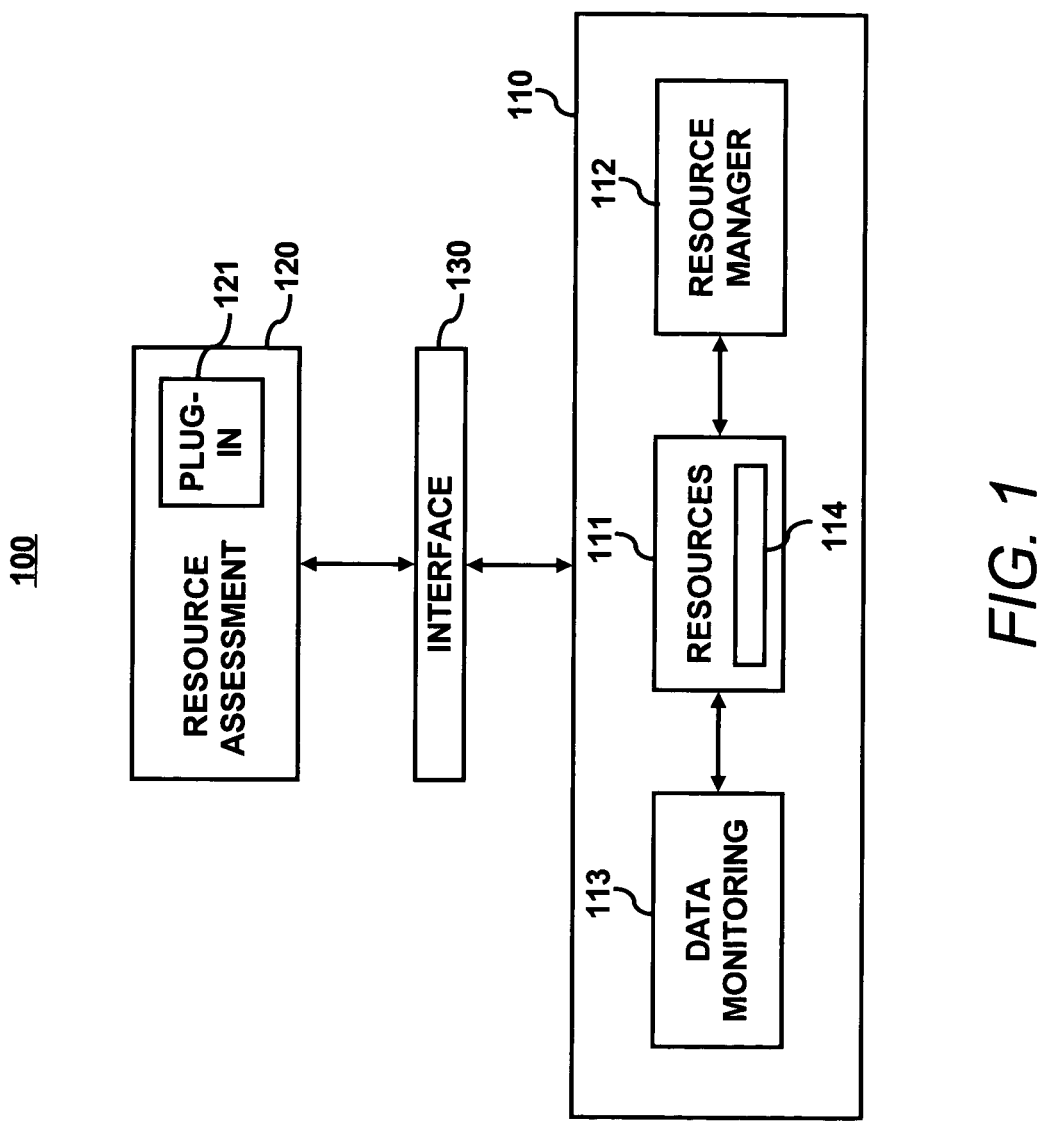
FIG. 1 illustrates a system, according to an embodiment.

FIG. 1 illustrates a system 100 according to an embodiment that provides computer resources on demand and is operable to adjust allocated computer resources as needed. The system 100 includes a resource infrastructure 110 and a resource assessment computer system 120. The resource assessment computer system 120 includes a control plug-in 121 that includes a specifiable policy for allocating computer resources in the resource infrastructure 110. The control plug-in 121 may include parameters and a control function as described in further detail below. The control plug-in 121 and other control plug-ins, not shown, may be software that is customizable and executed by the resource assessment computer system 120 for implementing different policies. Control plug-ins are described in further detail below. Furthermore, the resource assessment computer system 120 may include one or a plurality of computer systems, such as one or more servers. Each resource assessment computer system may include and run one or more control plug-ins.

The resource infrastructure 110 includes a pool of computer resources 111, a resource manager computer system 112, and a data monitoring system 113. The resource manager computer system 112 receives instructions for allocating computer resources available in the pool of computer resources 111 for a user's computing needs, such as allocating computer resources for a user's application 114. Based on the instructions the resource manager computer system 112 increases or decreases the computer resources allocated for the application 114. The application 114, which is shown in the pool of computer resources 111, is running on a subset of the pool of resources 111 allocated to the application 114 by the resource manager computer system 112. It will be apparent to one of ordinary skill in the art that the system 100 is operable to allocate resources for multiple applications or multiple instances of an application running on resources from the pool of resources 111.

The data monitoring system 113 monitors predetermined metrics of the allocated computer resources and sends monitoring data, which includes measurements of the predetermined metrics, to the resource assessment computer system 120. Examples of the predetermined metrics may include CPU utilization, process queue lengths, IO and network bandwidth, memory utilization and swap rate. If the system 100 is implemented in a data center, the metrics may be collected by data center management software. If application data monitoring is provided, application-level metrics for the application 114 can also be collected, such as transaction rates, response times, numbers of simultaneous sessions, number of users, etc.

The pool of resources 111 may include computer systems or even components of computer systems. One feature of the system 100 is that the number of resources from the pool of resources 111 allocated to an application, such as the application 114, may change during run-time depending on demand the application is facing. Those resources can be flexed which means their capacity can be varied over time. Examples of those resources may include number of CPUs, number of variable server partitions on computer systems that support CPU partitioning, number of entire servers, or varying CPU allocations for or numbers of virtual machines. Resources from the pool of resources 111 are allocated for the application 114. Allocating may include but is not limited to adding servers into an application environment, configuring the servers to run in the application environment, which may include loading the necessary software, releasing servers and un-configuring the released servers from the application environment. CPUs, virtual machines, server partitions, and other types of resources may be similarly configured or un-configured as needed. The allocated computer resources for the application 114 may be adjusted by the resource manager computer system 112.

In one embodiment, the allocated resources are comprised of a server group including a plurality of servers of the same type. Server types may include servers for applications such as web servers, database servers, application servers, and servers used for any type of enterprise application. Examples of server types may include IA32 or 1p2000. The application 114 executed by the server group may be a horizontally-scalable application. A horizontally-scalable application is an application that runs on a number of servers in the server group simultaneously. Scalable means that the number of servers may be changed over time. Several instances of the application may be run by the server group. For example, an instance of an e-commerce application, which provides online shopping, may be duplicated for each user buying goods or services using the web application. During busy shopping seasons when demand to the e-commerce application is increasing, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

The resource infrastructure 110 contains all the resources 111 managed by the resource manager computer system 112. The resource manager computer system 112 may be managing several different sets of allocated computer resources for different users running different applications, and the resource assessment computer system 121 may be running several different control plug-ins for each application. A protected domain is formed around the resource infrastructure 111 to prevent unauthorized access to the allocated resources and the resource manager 112, for example, from an unrelated control plug-in, a computer virus, or other unauthorized applications.

An interface 130 is used to implement a protected domain around the resource infrastructure 110. The interface 130 provides security measures for crossing protected domains, such as a domain for the resource assessment computer system 120 and a domain for the resource infrastructure 110. Examples of the data the flows between the protected domains may include requests for monitoring data, such as from the resource assessment computer system 120, and the monitoring data included in the responses to the requests, such as provided by the data monitoring system 113. Also, instructions for adjusting allocated resources may be sent from the resource assessment computer system 120 to the resource manager computer system 112 via the interface 130. Examples of the security measures provided by the interface 130 may include control plug-in authentication and establishing encrypted communication channels. Control plug-ins may be authenticated using certificates. For example, a control plug-in's certificate is validated by the interface 130. Only certificates that are registered at the interface 130 can be validated. Encrypted communication channels can be created as is known in the art. The interface 130 may include software and/or hardware in the computer assessment system 120 and the resource manager computer system 112. In one example, the Open Grid Services Infrastructure (OGSI) or the Web Service Resource (WSRF) is used to implement the interface 130. OGSI and WSRF are standards that define mechanisms for creating, managing, and exchanging information among entities. The mechanisms specified in these standards may be used to provide one or more of the security measures for the interface 130.

The resource assessment computer system 120, using the policy provided in the control plug-in 121 and the monitoring data, including the metrics from the data monitoring system 113, determines whether the application 114 and the allocated resources executing the application 114 are operating within defined bounds, such as specified in the control plug-in 121. The rules for this assessment is the policy specified in the control plug-in 121. Based on the assessment, the resource assessment computer system 120 may take corrective action, such as instructing the resource manager computer system 112 to increase or decrease the computer resources allocated to the application 114.

Policies in control plug-ins may be specified through control functions and parameters in the control plug-ins. The control function in a control plug-in may use one or more parameters for assessing allocated resources. In a simple case, a control function in a control plug-in uses upper and lower threshold parameters. For example, the control plug-in 121 specifies an upper and lower threshold for the current load level of a server group allocated for the application 114. When the load level surpasses the upper threshold, the control plug-in 121 makes a decision to flex up, i.e., add more servers into the server group. When the load level falls below the lower threshold, the control plug-in 121 decides to flex down, i.e., release servers from the server group. A third parameter may include a time interval within which load levels have to remain above the upper or below the lower threshold in order to trigger a resource adjustment. The load level may be determined by the metrics measured by the data monitoring system 113 and transmitted to the resource assessment computer system 120. For example, a current load level of a server group may be an aggregate number of metrics for each server, such as CPU load, memory usage, IO activity, and possibly other metrics.

An example of a control function used in a control plug-in may be described as follows:

F(p1, p2, p3, . . . )→newN with newN=curN (no change)
newN>curN (flex up)
newN<curN (flex down)

The control function F calculates a new target number of resources (newN) that satisfies desired performance under current conditions based on the parameters (p=p1, p2, p3 . . . ). The newN is the target number of resources, such as servers in a server group, and curN is the current number of resources allocated for an application, such as the current number of servers in a server group for the application. If the target number of severs is equal to the current number of servers, then, for example, there is no change instructed by the resource assessment computer system 120 running the above-described control plug-in. If the target number of servers is less than the current number of server, then the resource assessment computer system instructs the resource manager computer system 112 to flex up. If the target number of servers is greater than the current number of server, then the resource assessment computer system instructs the resource manager computer system 112 to flex down.

The parameters p used by the control function F may include "operational conditions" in the underlying controlled system, such as the load level in a server group. The parameters p may also describe the "desired conditions" such as boundaries or thresholds within which a control system operates, such as the control system 200 shown in FIG. 2 and described in detail below. Desired conditions also include preferences or constraints to be obeyed by the control system. An example is described below for a set of parameters p1 . . . p7 for a control function.

An example of a parameter set for operational conditions may include:

p1: LL (current load level in a server group);
p2: curN (current number of servers in a server group).

An example of a parameter set for desired conditions may include:

p3: LPSupp (upper threshold for load per server: (LL/curN), e.g. 80%);
p4: LPSlow (lower threshold for load per server: (LL/curN), e.g. 40%).

An example of hard constraints within the desired conditions may include:

p5: min.servers (minimal number of servers that must be maintained in the server group);
p6: max servers (maximal number of servers that must be maintained in the server group).

An example of preferences within the desired conditions may include:

p7: pref_LoadLevelPerServer (preferred load level of a server with: LPSlow≤pref_LoadLevelPerServer≤LPSupp).

The behavior of a control plug-in can be influenced by the parameter set p1 . . . p'7. An example below includes a control function utilizing the parameter set p1 . . . p7. This control function is invoked any time a change in one of its input parameters p1 . . . p7 occurs, which may be reported to the resource assessment computer system 120 as a parameter change event from the data monitoring system 113.

int control Function(LL, curN)//arguments from parameter set p1 . . . p7
{LLPS=LL/curN; //current load level per server
newN=curN; //don't flex when LLPS remains within bounds
if (LLPS>LPSupp or LLPS<LPSupp or surplusControl)
{newN=RoundUp (LL/pref_LoadLevelPerServer);
newN=max(min(newN, max.Servers), min.servers);}
return newN;}

When the load per server exceeds the upper threshold or falls below the lower threshold, or the parameter set has changed, the new number of servers is calculated by:

newN=LL/pref LoadLevelPerServer.

The new number of servers is bound to constraints: newN=max(min(newN, max servers), min servers).

The control plug-ins are customizable. Adjusting any of the parameters describing desired conditions changes the control decisions made by the control plug-in. By providing a new or changing the existing parameter set p1 . . . p7, users, system administrators operators, or systems, such as a server surplus control system, can influence the result of the control function performed by the control plug-in. Also, control plug-ins may comprise software provided by the user, the system administrator, or another system. By using control plug-ins, the system 100 can easily receive and accommodate new policies for allocating the resources 111.

Furthermore, control plug-ins may be included in a hierarchal control plug-in architecture, where each intermediate layer in the hierarchy receives input that could change a parameter and generates an output, such as a control decision to change a parameter of a lower level control plug-in. At the bottom layer, the control plug-in's may output flex up or flex down instructions.

Figure 2:
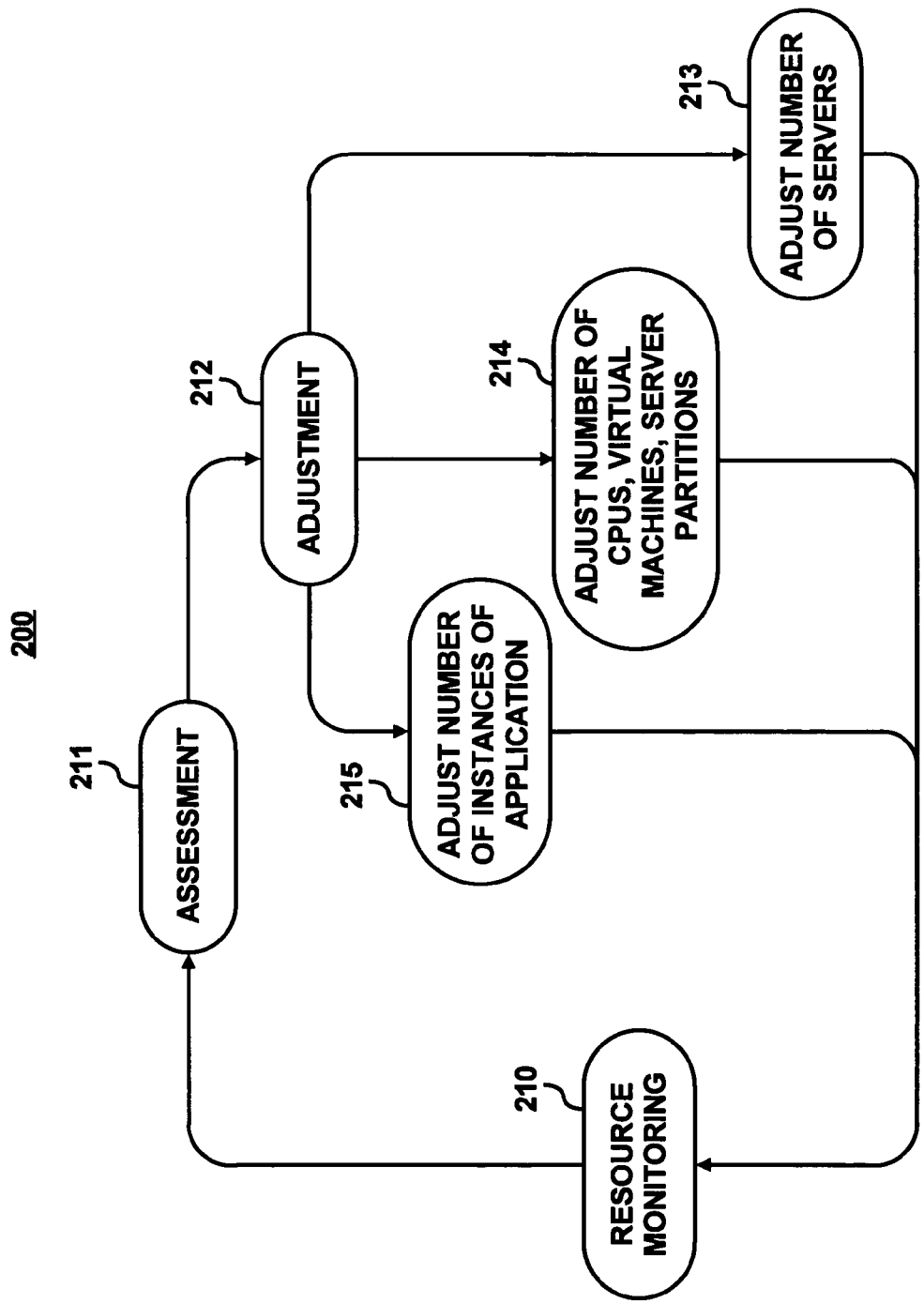
FIG. 2 illustrates a control loop, according to an embodiment.

FIG. 2 illustrates a control loop 200 performed by the system 100 for adjusting allocated resources, according to an embodiment. The control loop 200 illustrates examples of the allocated resources that may be adjusted. The control loop 200 includes resource monitoring 210 performed by the data monitoring system 113 shown in FIG. 1, assessment 211 performed by the resource assessment computer system 121 shown in FIG. 1 using the control plug-in 121 and monitoring data, and adjustment 212 of the allocated resources if needed is performed by the resource manager computer system 112 shown in FIG. 1. The control loop 200 illustrates three examples of adjusting resources, including adjusting the number of servers in a server group 213, adjusting the number of virtual machines, server partitions or CPUs 214, and adjusting the number of instances of a horizontally-scalable application 215. For 213 and 214, the number of computer systems may remain constant (e.g., the number of servers in a server group remains constant) while the number of instances of the application or the number of virtual machines, server partitions or CPUs may be adjusted by the resource manager computer system 112. For 215, the number of servers may be adjusted by the resource manager 112. Also, the three adjustments 213-215 may be used as different levels of granularity. When a finer-grained adjustment, such as the adjustments 214 or 215, reaches its limits, the next level of adjustment, such as the adjustment 213 can be used to increase or decrease allocated resources. The different adjustments 213-215 may be used in any combination to adjust resources to meet the policies specified in the control plug-in 121.

Figure 3:
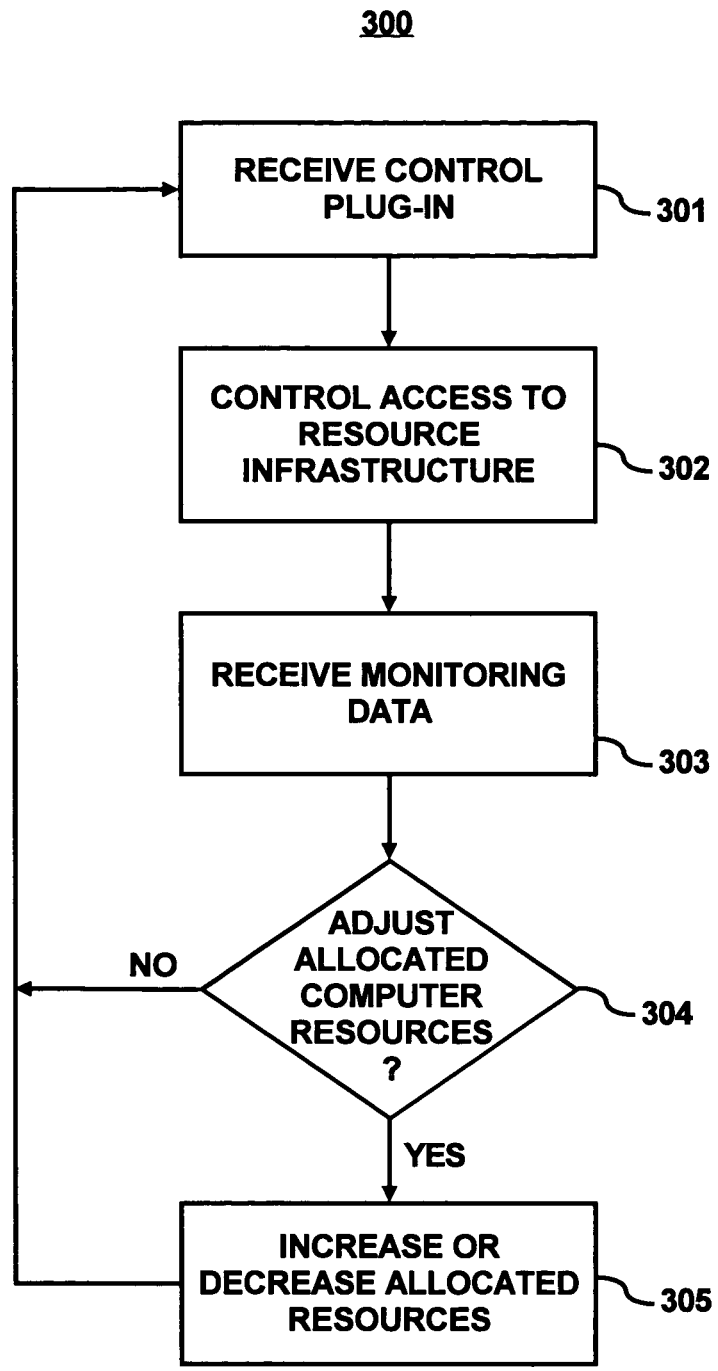
FIG. 3 illustrates a flow chart of a method for adjusting allocated computer resources, according to an embodiment.

FIG. 3 illustrates a flow chart of a method 300 for adjusting resources, according to an embodiment. The method 300 is described with respect to the system 100 shown in FIG. 1 by way of example and not limitation.

At step 301, the resource assessment computer system 120 receives the control plug-in 121 including a policy for adjusting computer resources allocated for the application 114. At step 302, the interface 130 is used to control the control plug-in's access to the resource infrastructure 110. Examples of controlling access may include authenticating the control plug-in 121 and establishing encrypted communication channels. Other security measures may also be implemented.

At step 303, the resource assessment computer system 120 receives monitoring data for the allocated resources from the data monitoring system 113. The monitoring data may include predetermined metrics. At step 304, the resource assessment computer system 120 determines whether to adjust the computer resources based on the policy specified in the control plug-in 121 and the monitoring data. At step 305, if adjustments are needed, the resource manager computer system 112 increases or decreases the allocated resources. For example, if the resource assessment computer system 120 determines an adjustment is needed, then the resource assessment computer system 120 sends instructions via the interface 130 to the resource manager computer system 112 for making the needed adjustments. If adjustments are or are not needed, the method 300 may be repeated.

Modifications to the method 300 may be made as would be apparent to one of ordinary skill in the art. Steps may be performed in different orders. For example, a control plug-in being received at step 301 may be performed after an interface is established and used to control access to the resource infrastructure 110 at step 302.

Figure 4:
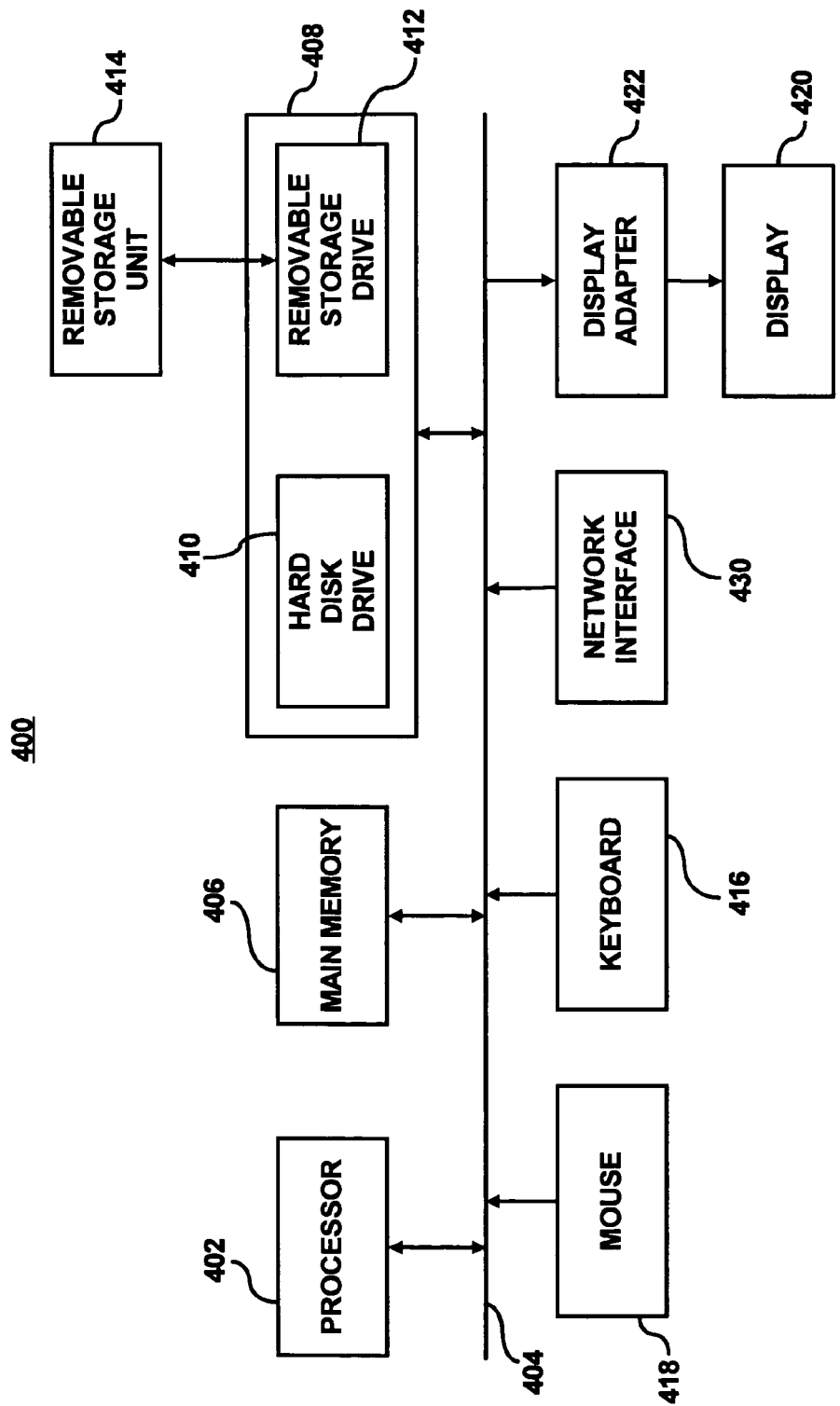
FIG. 4 illustrates a computer system, according to an embodiment.

FIG. 4 illustrates a block diagram of a general purpose computer system 400 that may be used as a computer system in the system 100, such as the resource assessment computer system 120 or the resource manager computer system 112. It will be apparent to one of ordinary skill in the art that a more sophisticated computer system may be used. Furthermore, components may be added or removed from the computer system 400 to provide the desired functionality.

The computer system 400 includes one or more processors, such as processor 402, providing an execution platform for executing software. Commands and data from the processor 402 are communicated over a communication bus 404. The computer system 400 also includes a main memory 406, such as a Random Access Memory (RAM), where software may be resident during runtime, and a secondary memory 408. The secondary memory 408 includes, for example, a hard disk drive 410 and/or a removable storage drive 412, representing a floppy diskette drive, a magnetic tape drive, a compact disk drive, etc., or a nonvolatile memory where a copy of the software may be stored. The secondary memory 408 may also include ROM (read only memory), EPROM (erasable, programmable ROM), EEPROM (electrically erasable, programmable ROM). The removable storage drive 412 reads from and/or writes to a removable storage unit 414 in a well-known manner.

A user interfaces with the computer system 400 with one or more input devices 428, such as a keyboard, a mouse, a stylus, and the like. The display adaptor 422 interfaces with the communication bus 404 and the display 420 and receives display data from the processor 402 and converts the display data into display commands for the display 420. A network interface 430 is provided for communicating with other computer systems.

One or more of the steps of the method 300 may be implemented as software embedded on a computer readable medium, such as the memory 406 and/or 408, and executed on the computer system 400, for example, by the processor 402. Examples of some of the steps may include determining whether to adjust allocated computer resources, generating instructions for adjusting allocated computer resources, adjusting the allocated computer resources, and controlling the access to the resource infrastructure 110, such as authenticating a control plug-in.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A system comprising:
   a resource manager computer system to allocate computer resources from a pool of computer resources for executing an application;
   a data monitoring system to monitor metrics for the allocated computer resources; and
   a resource assessment computer system to receive and execute a control plug-in specifying a policy for determining whether to adjust the computer resources allocated to execute the application based on the metrics,
   wherein the control plug-in includes a control function specifying a calculation for calculating a new target amount of the computer resources that satisfies a desired performance of the computer resources under current system conditions based on the parameters, and the parameters include an operational condition and a desired condition of the computer resources, and
   the resource assessment computer system is to execute the control plug-in, including the control function, to calculate the new target amount of the computer resources based on the parameters, and the resource assessment computer system is to determine whether to adjust the computer resources by comparing the new target amount of the computer resources with the metrics, wherein the resource assessment computer system is to receive a new desired condition and include the new desired condition in the control plug-in to customize the control plug-in, and execute the customized control plug-in to calculate a revised target amount of the computer resources based on the parameters and the new desired condition.

2. The system of claim 1, further comprising:
   a resource infrastructure including the resource manager computer system, the data monitoring computer system, and the pool of computer resources; and
   an interface limiting access of the resource manager computer system to the resource infrastructure.

3. The system of claim 2, wherein the interface is to authenticate the control plug-in.

4. The system of claim 2, wherein the resource assessment computer system is to receive the metrics via the interface and is to send instructions for adjusting the allocated computer resources to the resource manager computer system via the interface.

5. The system of claim 1, wherein the allocated computer resources comprises a server group including a plurality of servers of the same type.

6. The system of claim 5, wherein the resource assessment computer system is to instruct the resource manager computer system to increase or decrease a number of servers in the server group.

7. The system of claim 1, wherein the resource assessment computer system is to instruct the resource manager computer system to increase or decrease a number of CPUs for the allocated computer resources, server partitions for the allocated computer resources, virtual machines for the allocated computer resources, or a number of instances of the application running on the allocated computer resources.

8. A method comprising:
receiving a control plug-in including a policy for adjusting an amount of computer resources executing an application, wherein the control plug-in includes a control function specifying a calculation for calculating a new target amount of the computer resources that satisfies a desired performance of the computer resources under current system conditions based on parameters, and the parameters include an operational condition and a desired condition of the computer resources;
executing, by a resource assessment computer system, the control plug-in, including the control function, to calculate the new target amount of the computer resources based on the parameters;
customizing the control plug-in, wherein the customizing includes receiving a new desired condition, and including the new desired condition in the control plug-in; and
executing the customized control plug-in to calculate a revised target amount of the computer resources based on the parameters and the new desired condition.

9. The method of claim 8, comprising: controlling the control plug-in's access to a resource infrastructure including the computer resources and a resource manager computer system allocating the computer resources for executing the application from a pool of computer resources.

10. The method of claim 9, wherein controlling the control plug-in's access to a resource infrastructure further comprises: establishing an encrypted communication channel between the control plug-in and the resource manager computer system.

11. The method of claim 8, further comprising:
receiving instructions from the resource assessment computer system running the control plug-in to adjust the computer resources executing the application; and
adjusting the computer resources.

12. The method of claim 11, wherein adjusting computer resources comprises at least one of adjusting a number of servers in a server group, and adjusting a number of CPUs, server partitions, or virtual machines.

13. The method of claim 11, wherein adjusting the computer resources comprises increasing or decreasing a number of instances of the application.

14. The method of claim 8, wherein the computer resources executing the application comprises a server group including a plurality of servers of the same type.

15. A computer program provided on a computer readable storage device and comprising machine readable instructions executable by at least one processor to:
receive a control plug-in including a policy for adjusting an amount of computer resources executing an application, wherein the control plug-in includes a control function specifying a calculation for calculating a new target amount of the computer resources that satisfies a desired performance of the computer resources under current system conditions based on parameters, and the parameters include an operational condition and a desired condition of the computer resources;
execute the control plug-in using the control function to calculate the new target amount of the computer resources based on the parameters;
customize the control plug-in, wherein the customizing includes receiving a new desired condition and including the new desired condition in the control plug-in; and
execute the customized control plug-in to calculate a revised target amount of the computer resources based on the parameters and the new desired condition.

16. The computer program of claim 15, wherein the machine readable instructions are executable to:
determine whether to adjust computer resources allocated for a user's computing needs based on the revised target amount of the computer resources and metrics for the allocated computer resources; and
adjust the allocated computer resources in response to determining the computer resources need to be adjusted, wherein the adjusting of the allocated computer resources comprises adjusting at least one of a number of servers in a server group running the application, a number of instances of the application, and a number of CPUs, server partitions, or virtual machines allocated for the user's computing needs.

17. The computer program of claim 15, wherein the machine readable instructions are executable to: authenticate the control plug-in including the policy.

18. The method computer program of claim 15, wherein the application comprises a plurality of instances of the application and the machine readable instructions are executable to: increase or decrease a number of instances of the application running computer resources allocated to the application.

19. A system comprising:
data storage to store a plurality of control plug-ins for different applications, each control plug-in including
a policy for adjusting an amount of computer resources executing an application,
a control function specifying a calculation for calculating a new target amount of the computer resources that satisfies a desired performance of the computer resources under current system conditions based on parameters, wherein each control plug-in includes a different control function, and the parameters include an operational condition and a desired condition of the computer resources; and
at least one processor to
execute the control plug-in for each application using the control function and the parameters of the control plug-in for the application to calculate the new target amount of the computer resources;
customize one of the control plug-ins, wherein the customizing includes receiving a new desired condition and including the new desired condition in the control plug-in; and
execute the customized control plug-in to calculate a revised target amount of the computer resources based on the parameters and the new desired condition.

20. The system of claim 19, wherein one of the applications comprises a plurality of instances of the application, and the at least one processor is to increase or decrease a number of instances of the running on the computer resources allocated to the application.

* * * * *

UNITED STATES PATENT AND TRADEMARK OFFICE
CERTIFICATE OF CORRECTION

| | | |
|---|---|---|
| PATENT NO. | : 8,826,287 B1 | Page 1 of 1 |
| APPLICATION NO. | : 11/046333 | |
| DATED | : September 2, 2014 | |
| INVENTOR(S) | : Sven Graupner et al. | |

It is certified that error appears in the above-identified patent and that said Letters Patent is hereby corrected as shown below:

In the Claims

In column 8, line 30, in Claim 1, after "on" delete "the".

In column 8, line 32, in Claim 1, delete "resources," and insert -- resources; --, therefor.

In column 10, line 26, in Claim 18, after "The" delete "method".

In column 10, line 30, in Claim 18, delete "running" and insert -- running on --, therefor.

In column 10, line 60, in Claim 20, delete "the" and insert -- the application --, therefor.

In column 10, line 60, in Claim 20, after "on" delete "the".

Signed and Sealed this
Third Day of February, 2015

Michelle K. Lee
*Deputy Director of the United States Patent and Trademark Office*